(12) United States Patent
Aketagawa et al.

(10) Patent No.: US 6,961,238 B2
(45) Date of Patent: Nov. 1, 2005

(54) ELECTRONIC DEVICE

(75) Inventors: Hiromu Aketagawa, Musashimurayama (JP); Hiroshi Sawabe, Asaka (JP); Koichi Kobayashi, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 10/434,273

(22) Filed: May 9, 2003

(65) Prior Publication Data

US 2003/0227709 A1 Dec. 11, 2003

(30) Foreign Application Priority Data

Jun. 7, 2002 (JP) ........................................ 2002-166859

(51) Int. Cl.$^7$ ................................................. G06F 1/16
(52) U.S. Cl. ..................... 361/685; 360/73.02; 206/320
(58) Field of Search ............................... 361/679–687, 361/724–727; 312/223.1–223.6; 360/73.02; 439/928.1; 206/320

(56) References Cited

U.S. PATENT DOCUMENTS

| | | | | |
|---|---|---|---|---|
| 5,772,025 | A | | 6/1998 | Chen et al. ................. 206/320 |
| 6,788,532 | B2 | * | 9/2004 | Yang et al. ................. 361/685 |
| 2002/0085346 | A1 | * | 7/2002 | Choi .......................... 361/685 |
| 2003/0045327 | A1 | | 3/2003 | Kobayashi et al. |
| 2003/0141849 | A1 | | 7/2003 | Kobayashi et al. |
| 2003/0223142 | A1 | | 12/2003 | Mizuhiki et al. |
| 2004/0023683 | A1 | | 2/2004 | Mizuhiki et al. |

FOREIGN PATENT DOCUMENTS

| | | | |
|---|---|---|---|
| CH | 1086943 A | | 5/1994 |
| EP | 0 843 423 A1 | | 5/1998 |
| JP | 58-10974 | | 1/1983 |
| JP | 1205784 | * | 8/1989 |
| JP | 03-225782 A | | 10/1991 |
| JP | 7029363 | * | 1/1995 |
| JP | 9-271069 | | 10/1997 |
| JP | 10-79097 | | 3/1998 |
| JP | 10-79908 | | 3/1998 |
| JP | 10-164251 | | 6/1998 |
| JP | 11-184559 A | | 7/1999 |
| JP | 3082215 | | 9/2001 |
| JP | 2001-266562 A | | 9/2001 |
| WO | WO 97/33387 | | 9/1997 |
| WO | WO 01/48758 | | 7/2001 |

OTHER PUBLICATIONS

Japanese Office Action dated Dec. 7, 2004, for Japanese Patent Application No. 2002–166859.
Japanese Office Action dated Mar. 15, 2005 for Appln. No. 2002–166859.
U.S. Apppl. No. 10/096,753 filed Mar. 14, 2002 Kobayashi et al.
U.S. Appl. No. 10/253,914 filed Sep. 6, 2002 Kobayashi et al.

* cited by examiner

*Primary Examiner*—Hung Van Duong
(74) *Attorney, Agent, or Firm*—Pillsbury Winthrop Shaw Pittman, LLP

(57) ABSTRACT

A disk device comprises an HDD, dampers, PCB, and case that houses the HDD, dampers and PCB. The connection direction of the connector of the HDD differs from that of the connector of the PCB by an angle of 90°. A flat cable connecting the connectors is angled at two positions.

6 Claims, 2 Drawing Sheets

ELECTRONIC DEVICE

CROSS-REFERENCE TO RELATED APPLICATIONS

This application is based upon and claims the benefit of priority from the prior Japanese Patent Application No. 2002-166859, filed Jun. 7, 2002.

BACKGROUND OF THE INVENTION

1. Field of the Invention

The present invention relates to an electronic device that comprises two relatively movable electronic components having terminals connected to each other via a connection line, and more particularly to an electronic device in which a hard disk drive (hereinafter referred to as "HDD") with a buffer for absorbing impacts is connected to a circuit board via a flat cable.

2. Description of the Related Art

Electronic apparatuses, such as personal computers, contain an HDD as a large capacity storage. In general, HDDs are connected to a circuit board via a relatively inexpensive, flat cable. The flat cable is formed of a plurality of cords arranged parallel to be flat. The flat cable is flexible, but resists bending in a plane parallel to the flat cable.

Accordingly, in the prior art, to enable the connector of an HDD to be connected to that of a circuit board when the HDD is superposed upon the circuit board, these connectors are designed so that their directions of connection differ by 180° from each other. When the connectors are connected, the flat cable is angled through 180° into a U-shape.

HDDs are provided with a buffer for absorbing impacts applied from the outside, and hence slightly vibrate when impact has been applied thereto. When the HDD superposed on the circuit board vibrates, it moves relative to the circuit board, thereby applying a load to the flat cable. If the load is applied in the width direction, the cable cannot be deformed. At this time, the load is directly transmitted from the cable to the connectors. As a result, the connectors may be damaged or the cable may be disengaged from them.

BRIEF SUMMARY OF THE INVENTION

An electronic device according to an embodiment of the invention comprises a first electronic component having a first connection terminal; a holding member which holds the first electronic component such that the first electronic component can move; and a second electronic component having a second connection terminal whose connection direction differs from a connection direction of the first connection terminal.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION

An embodiment of the invention will be described in detail with reference to the accompanying drawings.

Figure 1:
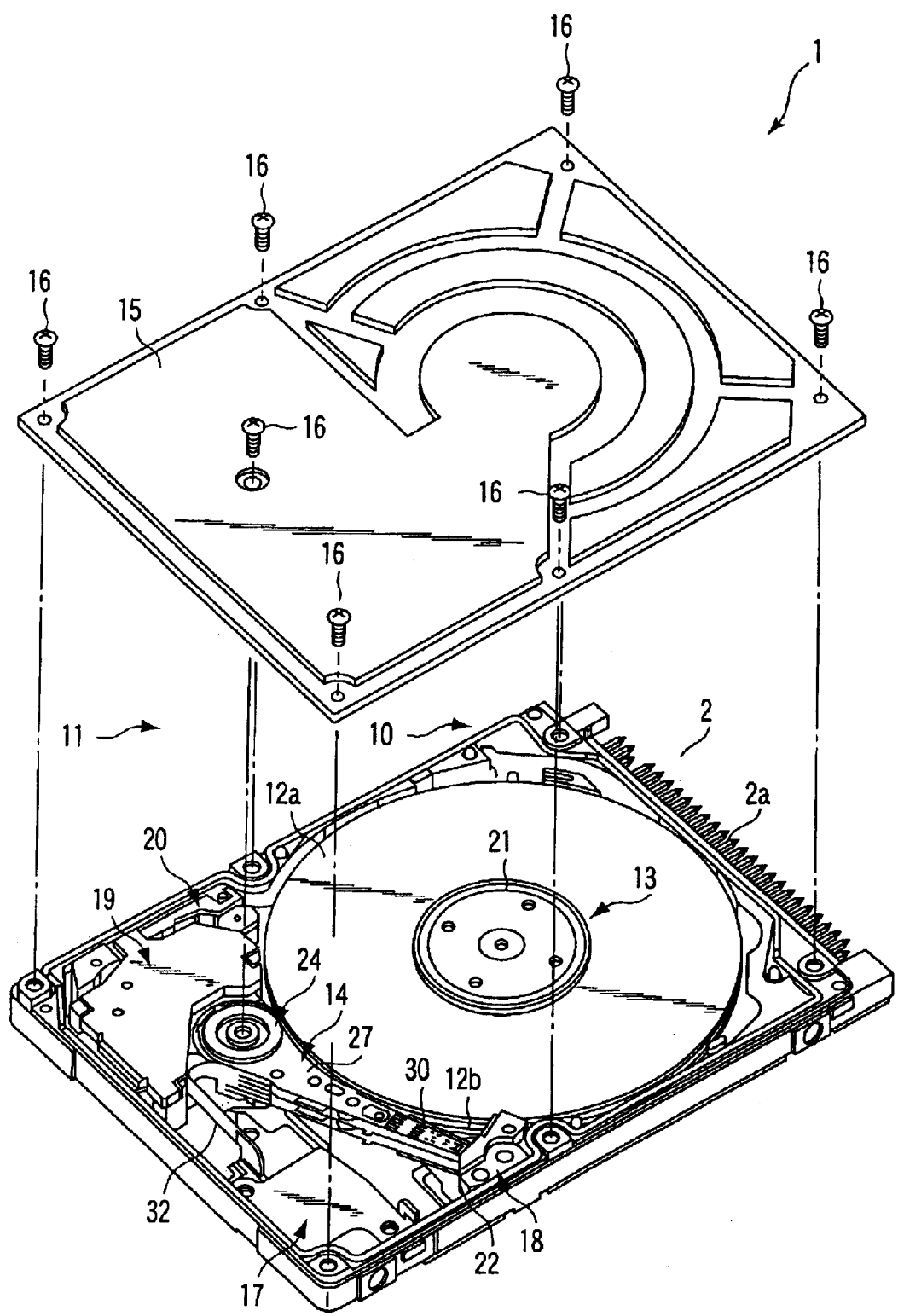
FIG. 1 is an exploded perspective view illustrating the internal structure of an HDD incorporated in an electronic device according to an embodiment of the invention.

FIG. 1 is an exploded perspective view showing a state in which a cover member 15 incorporated in a hard disk drive (HDD) 1 (first electronic component) is detached. The HDD 1 comprises a sealed, flat and rectangular housing 11. The housing 11 has a rectangular main unit 10 with an upper opening, and the above-mentioned rectangular cover member 15 screwed to the main unit 10 by a plurality of screws 16 and closing the opening of the unit 10.

The main unit 10 contains: a pair of magnetic disks 12a and 12b as a recording medium; spindle motor 13 (motor) for supporting and rotating the magnetic disks 12a and 12b; magnetic heads 22 (head) for recording/reproducing information to/from the magnetic disks 12a and 12b; head actuator 14 (actuator) supporting the magnetic heads 22 so that they can move over the magnetic disks 12a and 12b; voice coil motor (hereinafter referred to as "VCM") 19 for rotating and positioning the head actuator 14; ramp load mechanism 18 for holding the magnetic heads 22 at a position separate from the magnetic disks 12a and 12b when the heads have been moved to the outermost portions of the disks; inertia latch mechanism 20 for latching the head actuator 14 at a retracted position; and flexible printed circuit board unit (hereinafter referred to as an "FPC unit") 17 having circuit components, such as a pre-amplifier, mounted thereon.

A connector 2 (first connection terminal) for connecting a flat cable 4, described later, is provided at a longitudinal end of the main unit 10, protruding from the housing 11 to the outside. The connector 2 has a plurality of contacts 2a extending in the direction in which the flat cable 4 is connected.

The magnetic disks 12a and 12b have a diameter of, for example, 65 mm (2.5 inches), and magnetic recording layers provided on their upper and lower surfaces. The magnetic disks 12a and 12b are coaxially provided on the hub (not shown) of the spindle motor 13, separate from each other, and are secured thereto by a clamp spring 21. The magnetic disks 12a and 12b are rotated at a predetermined speed by the spindle motor 13.

The head actuator 14 comprises a bearing assembly 24 secured to the bottom of the main unit 10, four arms 27 attached to the bearing assembly 24, and magnetic head assemblies 30 supported by the respective arms 27. Each head assembly 30 has a slim suspension formed of a plate spring, and corresponding magnetic head 22 secured to the suspension.

Each magnetic head 22 is electrically connected to the FPC unit 17 via a relay flexible printed circuit board (not shown) attached to the surfaces of the corresponding arm 27 and suspension, and a main flexible circuit board 32.

During the operation of the HDD 1, the magnetic disks 12a and 12b are spun at a high speed by the spindle motor 13, and the head actuator 14 is swung by the VCM 19, thereby moving the magnetic heads 22 substantially radially over the magnetic disks 12a and 12b to position them on desired tracks.

In the HDD 1 constructed as the above, it is necessary to make each magnetic head 22 oppose the surface of a corresponding magnetic disk 12 with a small gap therebetween. If undesirable vibration is applied to the housing 11 from the outside, the magnetic heads 22 will easily touch the magnetic disks 12 that are rotating at a high speed, which may disable normal operation, and may, at worst, damage the magnetic heads 22 and/or magnetic disks 12.

In light of this, the HDD 1 is generally installed in electronic apparatuses such as personal computers, with a damper as a buffer attached. This damper prevents the above-described problem due to undesirable impacts.

Figure 2:
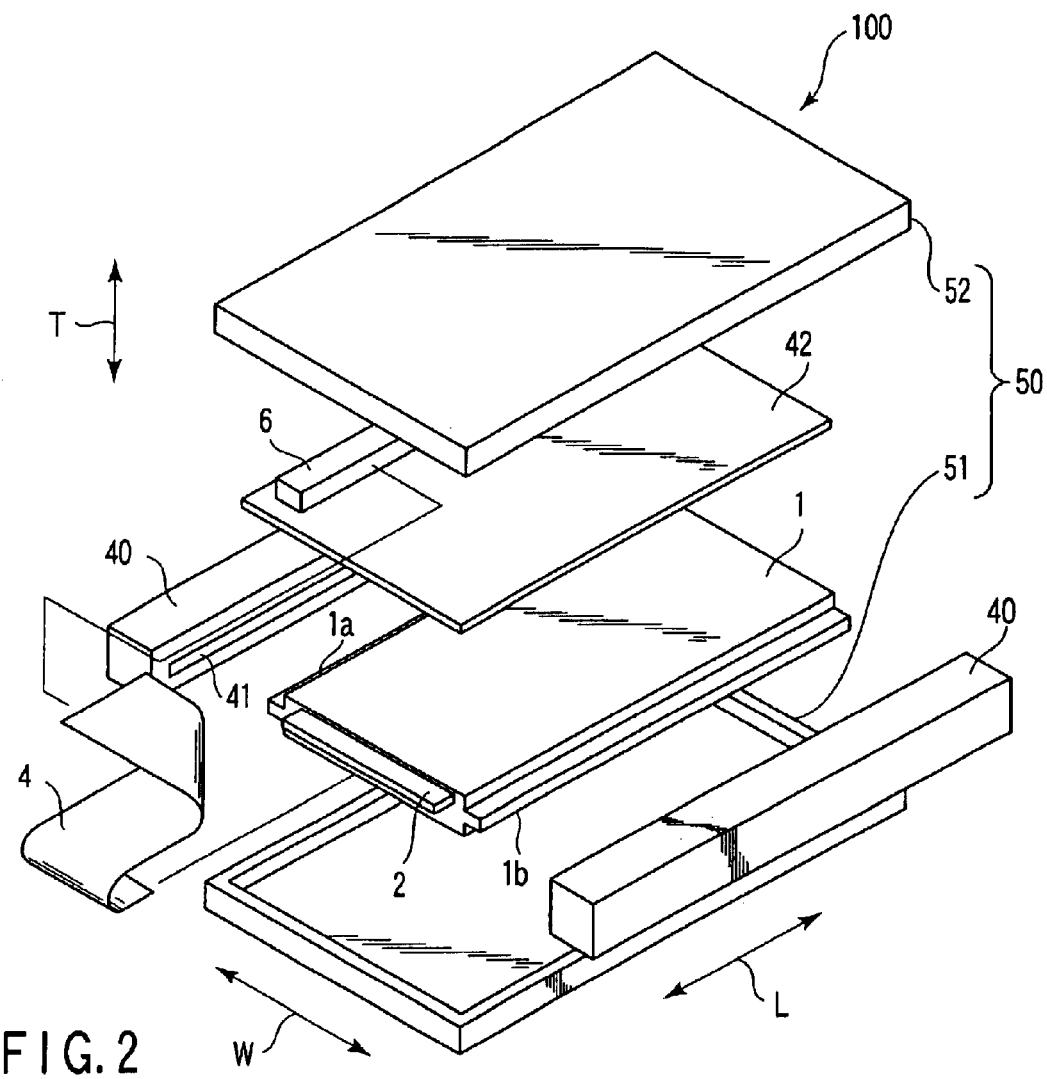
FIG. 2 is an exploded perspective view illustrating the electronic device provided with the HDD shown in FIG. 1.

FIG. 2 is an exploded perspective view illustrating a disk device 100 (electronic device) according to the embodiment of the invention, in which the HDD 1 is received in a case 50, with dampers 40 (holding members) as buffers interposed therebetween. The disk device 100 is characterized in that the HDD 1 is contained in the substantially rectangular case 50 (see FIG. 3) so that it can be carried together with the case. This differs from the structure in which the HDD 1 is directly mounted in an electronic apparatus such as a personal computer. Concerning the substantially rectangular disk device 100, the vertical direction along the axis of rotation of the magnetic disk 12, indicated by arrow T, will hereinafter be referred to as a "thickness direction", the direction indicated by arrow L as a "longitudinal direction", and the direction indicated by arrow W as a "width direction".

The disk device 100 comprises, as well as the above-mentioned HDD 1, two dampers 40, printed circuit board 42 (second electronic component) (hereinafter referred to simply as "PCB 42"), and case 50 that contains the HDD 1, dampers 40 and PCB 42. The dampers 40 are provided symmetrically, and attached to the sides 1a and 1b of the HDD 1 that are perpendicular to the end of the HDD 1 from which the connector 2 projects.

Each damper 40 is a substantially rectangular slim block member formed of, for example, rubber and having a slit 41 that extends in the longitudinal direction of the housing 11 of the HDD 1 indicated by arrow L. In the slit 41, the side 1a (1b) fits. The slit 41 is slightly shorter than the entire length of the damper 40, and has a depth that reaches substantially the center of the damper 40. Therefore, the side 1a (1b) is inserted up to substantially the center of the damper 40.

The PCB 42 is formed of a rectangular plate similar to the housing 11 of the HDD 1, and has a plurality of circuit elements (not shown) mounted thereon. These circuit elements are electrically connected to the FPC unit 17 of the HDD 1 for controlling the operations of the spindle motor 13, VCM 19 and magnetic heads 22. The PCB 42 opposes the cover member 15 of the HDD 1, with a small gap interposed therebetween in the thickness direction T of the housing 11 of the HDD 1. The PCB 42 is housed in the case 50, together with the HDD 11 with the dampers 40. Further, the PCB 42 has a connector 6 (second connection terminal) mounted on its upper surface. The connector 6 is connected to the connector 2 of the HDD 1 via the flat cable 4.

The attachment angle of the connector 6 of the PCB 42 is designed so that the connection direction of the flat cable 4 to the connector 2 of the HDD 1 (=the longitudinal direction L in this embodiment) will differ from that of the flat cable 4 to the connector 6 of the PCB 42 (=the width direction W in the embodiment). More specifically, the positional relationship between the connectors 2 and 6 is designed so that the connection direction of the flat cable 4 to the connector 2 will differ from that of the flat cable 4 to the connector 6 by an angle of 0° to 180°. In the embodiment, the attachment position and angle of the connectors 2 and 6 are set so that the difference is 90°.

The flat cable 4 (connection line) is formed of a plurality of cords (not shown) arranged parallel to be flat. The flat cable 4 is flexible, but resists bending in a plane parallel to the flat cable.

In the embodiment, since the HDD 1 and PCB 42 are superposed within the case 50, and the connection direction of the connector 2 is made to differ from that of the connector 6 by 90°, the flat cable 4 is angled, into a U-shape, by 180° at a certain position in the longitudinal direction, and is further angled, into an L-shape, by substantially 90° at another position.

By virtue of this structure, even if the HDD 1 vibrates relative to the PCB 42 due to impact from the outside, the HDD 1 can be moved in all directions, which prevents application of a width-directional load to the flat cable 4. As a result, the connectors 2 and 6 can be prevented from being damaged, and the flat cable 4 can be prevented from being disconnected from the connectors.

For example, when the HDD 1 moves in the longitudinal direction L relative to the PCB 42, the portion of the flat cable 4 angled into the U-shape deforms to absorb the longitudinal movement. On the other hand, when the HDD 1 moves in the width direction W, the portion of the flat cable 4 angled into the L-shape deforms to absorb the width-directional movement. Further, when the HDD 1 moves in the thickness direction T, both the angled portions of the flat cable 4 deform to absorb the T-directional movement.

Figure 3:
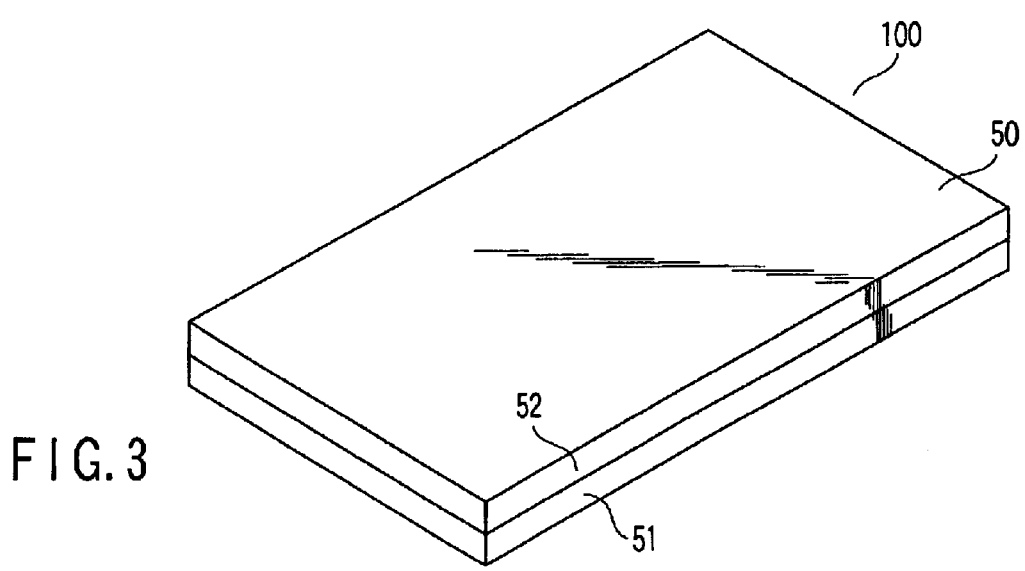
FIG. 3 is a perspective view illustrating the outward appearance of the electronic device shown in FIG. 2.

The case 50 has substantially rectangular lower and upper portions 51 and 52. When the lower and upper portions 51 and 52 are attached to each other, with the HDD 1, dampers 40 and PCB 42 contained therein, the disk device 100 as shown in FIG. 3 is provided. The case 50 does not touch the housing 11 of the HDD 1 at least.

As described above, in the embodiment, the HDD 1 is contained in the case 50 with the dampers 40 interposed therebetween, so that it can move to escape from serious impact applied thereto. Further, the angle of the connector 2 of the HDD 1 is made to differ from that of the connector 6 of the PCB 42, in order to prevent the connectors 2 and 6 from being damaged and the flat cable 4 from being disconnected from the connectors, when the HDD 1 moves relative to the PCB 42. Furthermore, the flat cable 4 that connects the connectors 2 and 6 is angled at two positions.

Where the connectors 2 and 6 are provided to form an angle therebetween, and the flat cable 4 connecting the connectors is angled at two positions, the load applied to the flat cable 4 in the width direction of the cable is reduced, thereby preventing damage to the connectors 2 and 6 and disconnection of the flat cable 4 from the connectors. As a result, the disk device 100 can have a high resistance against impact and hence operate in a highly reliable manner.

In addition, in the embodiment, the structure in which the flat cable 4 is angled at two position enables the HDD 1 to move in all directions (longitudinal direction L, width direction W, thickness direction T), thereby enhancing the degree of freedom in the attachment position and angle of the connectors 2 and 6. This means that the connectors 2 and 6 can be located at any desired position, at which the flat cable 4 can be easily provided and connected. Further, the disk device 100 can be easily assembled.

The invention is not limited to the above-described embodiment, but may be modified in various ways within the scope. For example, although the embodiment employs the relatively inexpensive flat cable 4 to connect the HDD 1 to the PCB 42, a relatively expensive flexible printed circuit board (FPC) may be used instead of the flat cable 4.

Although the invention is directed to a connection structure for the flat cable 4 that is used to connect the PCB 42 to the HDD 1 in which information is recorded in the magnetic disks 12, it is also applicable to other types of disk device, such as CDRs or DVDs.

The above-described connection structure of the invention is useful for the connection of electronic apparatuses installed in carriages such as vehicles, ships, airplanes, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
    (a) a case;
    (b) a first electronic component contained in the case, the first electronic component including,
        (i) a disk-shaped recording medium,
        (ii) a motor configured to support and rotate the recording medium,
        (iii) a head configured to record and reproduce information to and from the recording medium,
        (iv) an actuator configured to move the head over the recording medium,
        (v) a housing that houses the recording medium, the motor, the head, and the actuator, and
        (vi) a first connection terminal that projects the housing to an outside of the housing;
    (c) a holding member that holds the first electronic component such that the first electronic component can move relative to the case;
    (d) a second electronic component contained in the case, the second electronic component including a second connection terminal whose connection direction differs from a connection direction of the first connection terminal; and
    (e) a connection line that connects the first and second connection terminals, the connection line including a flat cable contained in the case in which a connection direction of the flat cable with respect to the first connection terminal differs from a connection direction of the flat cable with respect to the second connection terminal by an angle of more than 0° to less than 180°,
    wherein the flat cable connects the first and second connection terminals in a state in which the flat cable is angled at least at two positions.

2. The electronic device according to claim 1, wherein the second electronic component including the second connection terminal comprises a circuit board having a board and a circuit element mounted on the board that opposes the housing of the first electronic component with a small gap therebetween.

3. A portable electronic device containing a hard disk drive in a portable flat case, comprising:
    a flat housing of the hard disk drive having a first connection terminal at one end;
    a buffer having a slit in which end portions of the housing other than the one end are insertable, the buffer being configured to hold the housing such that the housing is movable relative to the case and to absorb impact applied to the housing from outside of the case;
    a circuit board, located opposite and close to the housing in the case, includes a circuit element mounted thereon, and has a second connection terminal whose connection direction differs relatively from that of the first connection terminal; and
    a flat cable which connects the first and second connection terminals in a state in which the flat cable is bent at two positions.

4. The electronic device according to claims 3, wherein the hard disk drive comprises:
    a disk-shaped recording medium;
    a motor configured to support and rotate the recording medium;
    a head configured to record and reproduce information to and from the recording medium;
    an actuator configured to move the head over the recording medium;
    the housing that houses the recording medium, the motor, the head and the actuator; and
    the first connection terminal which is provided at the one end of the housing.

5. The electronic device according to claim 3, wherein a connection direction in which the flat cable is connected to the first connection terminal and a connection direction in which the flat cable is connected to the second connection terminal are different by an angle of more than 0° to less than 180°.

6. The electronic device according to claims 5, wherein the hard disk drive comprises:
    a disk-shaped recording medium;
    a motor configured to support and rotate the recording medium;
    a head configured to record and reproduce information to and from the recording medium;
    an actuator configured to move the head over the recording medium;
    the housing that houses the recording medium, the motor, the head and the actuator; and
    the first connection terminal which is provided at the one end of the housing.

* * * * *